(12) United States Patent
Stevens

(10) Patent No.: US 11,037,078 B2
(45) Date of Patent: Jun. 15, 2021

(54) ADJUSTING DEVICE SETTINGS BASED UPON MONITORING SOURCE CODE DEVELOPMENT PROCESSES

(71) Applicant: Software.co Technologies, Inc., Irvine, CA (US)

(72) Inventor: Brett Michael Stevens, San Francisco, CA (US)

(73) Assignee: Software.co Technologies, Inc., Irvine, CA (US)

( * ) Notice: Subject to any disclaimer, the term of this patent is extended or adjusted under 35 U.S.C. 154(b) by 168 days.

(21) Appl. No.: 16/246,389

(22) Filed: Jan. 11, 2019

(65) Prior Publication Data

US 2020/0005212 A1    Jan. 2, 2020

Related U.S. Application Data

(60) Provisional application No. 62/690,855, filed on Jun. 27, 2018.

(51) Int. Cl.
| | | |
|---|---|---|
| G06Q 10/06 | (2012.01) | |
| G06F 8/77 | (2018.01) | |
| G06F 8/71 | (2018.01) | |

(52) U.S. Cl.
CPC ....... *G06Q 10/063112* (2013.01); *G06F 8/71* (2013.01); *G06F 8/77* (2013.01); *G06Q 10/06395* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 8,375,361 B2 * | 2/2013 | Bell | .......................... | G06F 8/71 |
| | | | | 717/120 |
| 8,856,725 B1 * | 10/2014 | Anderson | ................ | G06F 8/75 |
| | | | | 717/103 |

(Continued)

FOREIGN PATENT DOCUMENTS

| | | | | |
|---|---|---|---|---|
| EP | 2937779 B1 * | 1/2017 | ............... | G06F 8/71 |
| WO | WO-2015199656 A1 * | 12/2015 | ............... | G06F 8/77 |
| WO | WO-2017222567 A1 * | 12/2017 | ............... | G06F 8/30 |

OTHER PUBLICATIONS

Lal, Harsh, and Gaurav Pahwa. "Code review analysis of software system using machine learning techniques." 2017 11th International Conference on Intelligent Systems and Control (ISCO). IEEE, 2017. (Year: 2017).*

(Continued)

*Primary Examiner* — Matthew S Gart
*Assistant Examiner* — Derick J Holzmacher
(74) *Attorney, Agent, or Firm* — Fenwick & West LLP

(57) ABSTRACT

Embodiments relate to analyzing developmental progress and productivity of users based upon monitored activity features, and inferring expected levels of productivity for future time intervals. By analyzing code check-ins submitted by a user over a time interval, as other features associated with user activities during the time interval, a metric indicating a level of quality or productivity for the time interval can be determined. Based upon the determined metrics for the time intervals, expected levels of productivity for the user can be inferred for future time intervals. In addition, tasks can be automatically performed to reduce an amount of impact on the productivity of the user during time intervals of expected high productivity, such as scheduling of tasks outside of the time intervals, adjusting certain settings of a user device, and/or the like.

20 Claims, 10 Drawing Sheets

(56) References Cited

U.S. PATENT DOCUMENTS

| | | | | |
|---|---|---|---|---|
| 9,110,770 | B1* | 8/2015 | Raju | G06F 8/77 |
| 9,811,363 | B1* | 11/2017 | Wagner | G06F 9/44521 |
| 9,811,434 | B1* | 11/2017 | Wagner | G06F 8/43 |
| 9,830,175 | B1 | 11/2017 | Wagner | |
| 10,353,703 | B1 | 7/2019 | Sloyan et al. | |
| 2006/0015863 | A1* | 1/2006 | Vaidyanathan | G06F 8/71 |
| | | | | 717/170 |
| 2008/0301639 | A1* | 12/2008 | Bell | G06F 8/71 |
| | | | | 717/120 |
| 2009/0070734 | A1 | 3/2009 | Dixon et al. | |
| 2010/0299305 | A1* | 11/2010 | Laxman | G06F 8/71 |
| | | | | 707/609 |
| 2012/0192016 | A1* | 7/2012 | Gotesdyner | H04L 12/6418 |
| | | | | 714/47.3 |
| 2012/0331439 | A1* | 12/2012 | Zimmermann | G06F 8/77 |
| | | | | 717/101 |
| 2013/0074035 | A1 | 3/2013 | Nomura | |
| 2013/0311968 | A1* | 11/2013 | Sharma | G06F 11/3692 |
| | | | | 717/101 |
| 2013/0340076 | A1* | 12/2013 | Cecchetti | G06F 21/6218 |
| | | | | 726/23 |
| 2014/0123110 | A1* | 5/2014 | Wan | G06F 11/3672 |
| | | | | 717/124 |
| 2015/0082277 | A1* | 3/2015 | Champlin-Scharff | G06F 8/70 |
| | | | | 717/120 |
| 2017/0031800 | A1* | 2/2017 | Shani | G06F 11/3604 |
| 2017/0075790 | A1 | 3/2017 | MacLeod et al. | |
| 2017/0168676 | A1* | 6/2017 | Calder | G06F 3/0482 |
| 2017/0169382 | A1 | 6/2017 | Thapliyal et al. | |
| 2017/0235569 | A1* | 8/2017 | Sturtevant | G06Q 40/12 |
| | | | | 717/102 |
| 2017/0323211 | A1 | 11/2017 | Bencke et al. | |
| 2018/0275989 | A1* | 9/2018 | Kakkad | G06F 11/3409 |
| 2018/0276584 | A1* | 9/2018 | Woulfe | G06Q 10/06398 |
| 2018/0321918 | A1* | 11/2018 | McClory | H04L 63/0281 |
| 2018/0329705 | A1* | 11/2018 | Laredo | G06F 9/547 |
| 2018/0349114 | A1* | 12/2018 | Brown | G06N 20/00 |
| 2019/0347093 | A1 | 11/2019 | Challagolla et al. | |

OTHER PUBLICATIONS

Baum, Tobias, et al. "Comparing pre-commit reviews and post-commit reviews using process simulation." Journal of Software: Evolution and Process 29.11 (2017): e1865. (Year: 2017).*

Moreno-León, Jesus, Gregorio Robles, and Marcos Román-González. "Comparing computational thinking development assessment scores with software complexity metrics." 2016 IEEE global engineering education conference (EDUCON). IEEE, 2016. (Year: 2016).*

Bird, Christian, Trevor Carnahan, and Michaela Greiler. "Lessons learned from building and deploying a code review analytics platform." 2015 IEEE/ACM 12th Working Conference on Mining Software Repositories. IEEE, 2015. (Year: 2015).*

United States Office Action, U.S. Appl. No. 16/246,384, dated Jul. 24, 2020, 27 pages.

United States Office Action, U.S. Appl. No. 16/246,384, dated Dec. 30, 2020, 17 pages.

* cited by examiner

ADJUSTING DEVICE SETTINGS BASED UPON MONITORING SOURCE CODE DEVELOPMENT PROCESSES

CROSS REFERENCE TO RELATED APPLICATIONS

This application claims priority to U.S. Provisional Patent Application No. 62/690,855, filed Jun. 27, 2018, which is hereby incorporated by reference in its entirety.

BACKGROUND

This invention relates generally to collection and loading of data from software development tools into a comprehensive, full-stack analytics platform that enables developers and teams to improve productivity and performance, and to automatically adjust device settings based upon determined productivity and performance metrics.

Recent advances in software development have yielded an explosion of software development tools, including integrated development environments (IDEs), version control systems, source code repositories, and so on. These software development related tools are used across all stages of the software development lifecycle, such as source code design, source code development, testing, and release. Software development teams custom integrate complex tool stacks across these development stages for efficient development. Conventional data analytics to track and measure performance, such as individual tool dashboards and reports, do not provide full provide visibility across the software development lifecycle. As a result, it is difficult for development teams to measure relationships between activity and impact, establish velocity metrics and key ratios (such as code time to net code contribution), and track performance metrics across tools. Furthermore, any actions taken, such as task scheduling based on conventional monitoring tools are inaccurate since these provide incomplete information.

SUMMARY

Embodiments relate to analyzing developmental progress and productivity of users based upon monitored activity features, and scheduling tasks for the users based upon expected levels of productivity. For example, users may submit code check-ins over a plurality of time intervals. Each code check-in may comprise new code, deleted code, and/or reworked code. By analyzing the code check-ins submitted by a user over a time interval, in addition to other features associated with user activities during the time interval (e.g., type of code, applications accessed by user, context switches by the user, etc.), a metric indicating a level of quality or productivity for the time interval can be determined. Based upon the determined metrics for the time intervals, expected levels of productivity for the user can be inferred for future time intervals. In addition, tasks can be automatically performed to reduce an amount of impact on the productivity of the user during time intervals of expected high productivity, such as scheduling of tasks outside of the time intervals, adjusting certain settings of a user device, and/or the like.

Some embodiments include a method for automatically adjusting user device settings based upon expected user productivity. The method comprises receiving information describing a plurality of code check-ins performed in a code repository, and determining and storing a plurality of score values based on the plurality of code check-ins, each score value associated with a respective set of code check-ins of the plurality of code check-ins and indicative of a quality of code check-ins for the respective set of code check-ins. The method further comprises receiving information describing a new code check-in, the information describing whether the code checked in during the new code check-in represents original code or reworked code, responsive to determining that the new code check-in represents reworked code, identifying one or more previous code check-ins of the plurality of code check-ins associated with the reworked code, and, for each of the identified one or more previous code check-ins, identifying a set of code check-ins that includes the previous code check-in, and adjusting the score for the identified set of code check-ins in which the adjusted score represents a reduced quality of code check-ins of the set compared to the score prior to the adjustment. The method further comprises configuring a user interface for displaying scores indicative of the quality of code check-ins performed for each of the plurality of sets of code check-ins, identifying a future time interval based upon a first set of code check-ins of the plurality of code check-ins, wherein the score for the first set meets a threshold value, identifying a device of a particular user associated with the first set of code check-ins, and adjusting a setting of the identified device during the future time interval.

Figure 1:
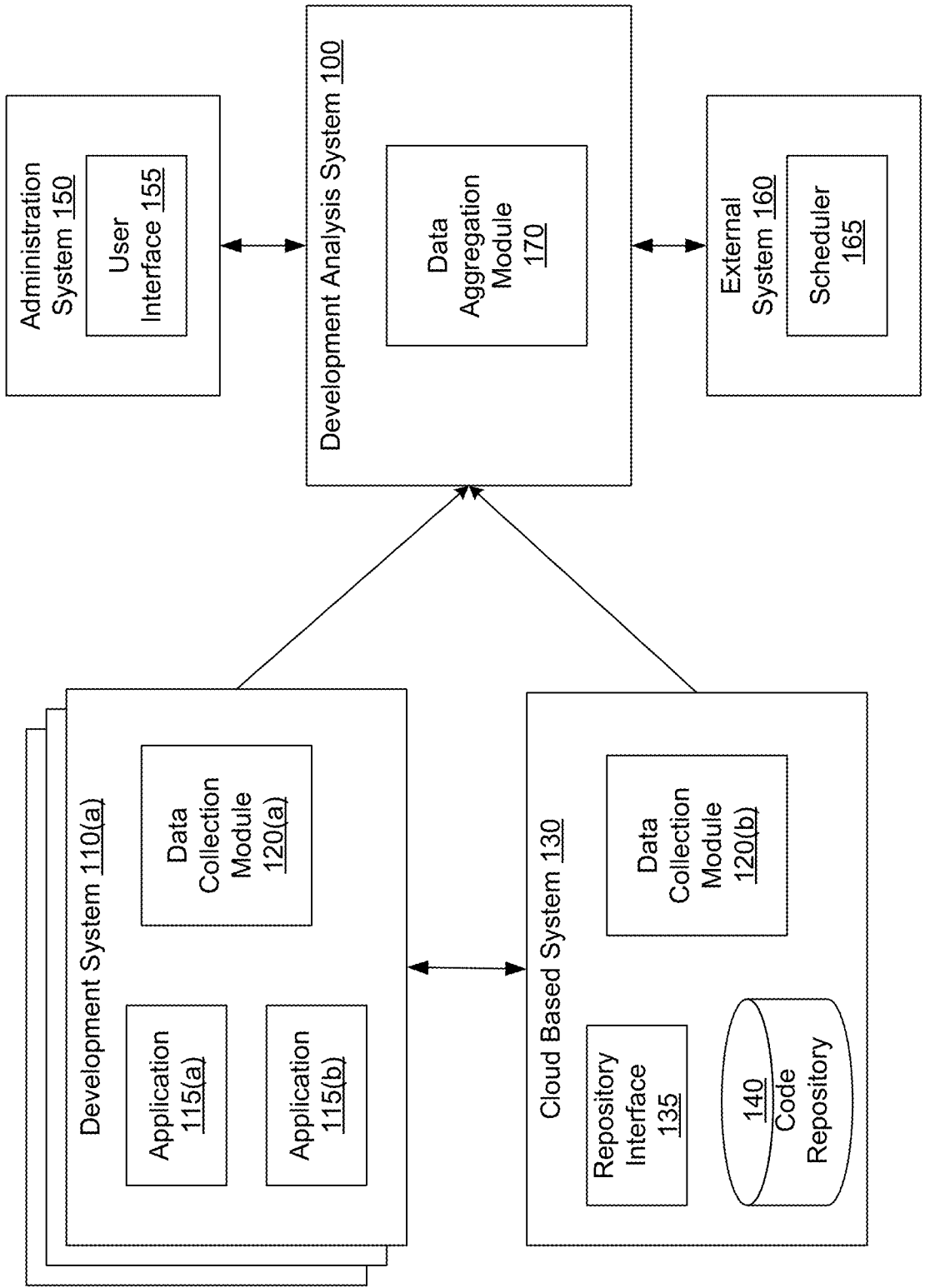
FIG. 1 shows the overall system environment for monitoring and analyzing source code development processes, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

The features and advantages described in this summary and the following detailed description are not all-inclusive.

Many additional features and advantages will be apparent to one of ordinary skill in the art in view of the drawings, specification, and claims.

DETAILED DESCRIPTION

Embodiments of the invention comprise systems, computer readable storage mediums storing instruction, and systems for analyzing source code developed by users. A development analysis system receives data from various tools and applications used by developers. Examples of applications and tools that act as sources of data include ATLASSIAN TRELLO, ATLASSIAN JIRA, GITHUB, GOOGLE CALENDAR, GOOGLE CHROME, SUBLIME TEXT (text editor), VISUAL STUDIO CODE (an integrated development environment, or IDE), SLACK, computer devices, and so on. The development analysis system receives different types of data including structured data (such that the data model and schema is known in advance) as well as unstructured data (e.g., logs). The development analysis system receives lines of code per check-in, information describing whether the check-in was on code that already existed, age of the code that a user checked in to (i.e., information identifying the code as new code, recently reworked code, code reworked long time back, deleted code, and so on.

The development analysis system generates reports based on the analysis of data. The reports may be published via a dashboard or other types of user interfaces. The reports describe the type of work performed by developers and also the rate at which developers perform work.

A code check-in represents a modification to the code stored in a repository performed by a developer. The modification represents one or more of, new code added to the repository, modification (rework) of previously added code (for example, to fix defects in previously checked-in code), deletion of code, and so on. The type of check-in may be indicated manually by the developer or by another user, or may be determined automatically based upon detected modifications to the code. The development analysis system determines rework by comparing a new version of code checked in with a previous version of the file. In an embodiment, the development analysis system determines that the code check-in represents new code if the number of lines of the file has increased by more than a threshold amount. The development analysis system determines that a check-in represents reworked code if the number of lines changed in the check-in is more than a threshold amount T1 but the increase in the number of lines is below a threshold amount T2. The development analysis system determines that a check-in represents deleted code if the comparison indicates a decrease in the number of lines that is greater than a threshold amount T3.

The development analysis system receives and stores information describing code check-ins for a plurality of time intervals (e.g., hours, days, or weeks). Information describing a code check-in includes, a measure of amount of code check-in, a flag indicating a type of code check-in (e.g., whether the code check-in was for new code added to the repository or whether the code check-in was for rework of previously added code, or whether the code check-in deleted code). The development analysis system determines for each time interval, a development score representing a quality of code check-in during that time period as an aggregate value based on score of each code check-in. According to an embodiment, the development analysis system determines development score for a check-in based on amount of code check-in that is normalized based on certain factors, for example, a factor indicating complexity of the code or complexity of the module in which code was checked in.

In an embodiment, the development analysis system receives a new check-in for a new time interval and determines whether the code is new code, rework or deletion. If the development analysis system determines that code is new code, the development analysis system determines a score based on the amount of the new code. If the code is not new but rework of previous code, the development analysis system identifies a previous check-in corresponding the code that was reworked. The development analysis system adjusts the score for the previous check-in based on the current check-in. For example, if the previous check-in was for new code/reworked code, the development analysis system decreases the score for the previous check-in based on an amount of rework done. For example, the development analysis system determines the number of lines checked in during the previous check-in that were modified and decreases the development score of the previous check-in based on the amount of rework done. If the development analysis system determines that a current check-in represents deletion of code, the development analysis system identifies previous check-ins during which the deleted code was added/modified and decrease the development score for the previous check-in. The development analysis system determines the development score for a user by aggregating developments scores for various check-ins for the user that may be performed by the user or by other users that rework the code associated with the user.

The development analysis system configures a user interface displaying a report, for example, a histogram representing the development scores for one or more users during various time intervals. The development analysis system generates reports that may aggregate information describing various code check-ins for a user, for a project, for a feature, for a team, for a storage unit of code (e.g., file, directory, component), and so on. The development analysis system is also referred to herein as the system.

Overview

The system performs cross-tool data analysis to analyze and perform actions that help improve productivity of developers and of the development processes. The system catalogues data across disparate software development tools to track related units. For example, units of work measured as keystrokes are correlated with units of work measured by other tools, for example, net code developed by user, and units of productivity measured by other tools, for example, revenue. The system evaluates data relationships across tools for related units. The system develops metrics based on statistical information collected across multiple tools. For example, metrics based on lines of code developed correlated with high productivity times determines from keystrokes monitored.

The system feeds data relationships into various front-end interfaces (e.g., UI, email, messaging) to trigger a related action. The system tracks and compares data relationships before and after triggers. The system feeds before and after data relationships back into various front-end interfaces in a continuous loop. For example, the system determines high productivity periods of development processes and feeds the information into a calendar application to reschedule meetings that are determined to overlap/interfere with high productivity periods. The actions triggered include either making recommendations to reschedule the meetings or actually moving the meetings as necessary. The system continues to measure productivity to determine whether the modified schedules result in improvement in productivity.

The system evaluates effectiveness of software development tools, programming languages and environments, and software development frameworks as follows. The system collects data from plugins or integrations, identifies other related software or hardware systems in use and detects if new systems are integrated. The system evaluates data across a set of users to determine a set of metrics and ratios related to each tool. The system supports a set of APIs to allow users or other software systems to extend or imbed the related metrics and ratios into other systems.

The system captures and analyzes data (e.g., statistics describing user interactions with peripheral devices, for example, keystrokes per minute (KPM) from integrated development environments (IDEs) and text editors or other tools used during the development processes), and performs analysis to determine peak flow times (highest coding productivity).

The system calculates projected KPM based on historical averages. The system uses the analysis of development times for scheduling tasks associated with development processes. For example, the system presents information in user interfaces overlaying calendar data (meetings) to see meetings that conflict with flow times. In an embodiment, the system automatically protects flow times by setting recurring calendar blocks. The system tracks how KPM correlates with commits, pull requests, and lines of code in software code repositories (e.g., GITHUB). The system allows traceability for units of work. The system performs tracking from KPM through to completed issues/tasks, story points, and function points in issue trackers (e.g., JIRA).

The development analysis system measures net code (new code, recode, deleted code) and determines how net code is correlated with test code and flow time. The system aggregates and analyzes data across teams to improve team productivity. The system performs rolling up of data from individuals, teams, to domains to large organization. The system connects software development related data all the way to product, revenue, human resources (HR) data. The system determines key performance indices (KPIs) on velocity and value related to business (based on cross-tool analysis).

The system builds reference classes and cohorts based on anonymized developer data (individual or combined metrics). The system uses the analysis to perform smart suggestions using artificial intelligence based on trends.

According to an embodiment, the system architecture includes client-side and server-side integrations that send data to a SaaS-based (software as a service) web service.

Various features of the system include: providing user interfaces that display highlights: daily, weekly, monthly, and all-time summary metrics; user interfaces that display leaderboards: public and team/organizations, making recommendations for setting goals for improvement; providing a virtual marketplace for exploring integrations and datagrams; performing automation of actions based on data trigger (e.g. blocking time on calendar, blocking notifications, set POMODORO timer (or any online/offline productivity timer or any tool for workplace time management), etc.); artificial intelligence and natural language processing based digests that interpret datagram (e.g. by generating natural language messages such as "Good morning! You have one upcoming meeting . . . "). The system supports data tolerance ranges, thereby excluding data from feed based on the richness or usability of the data. The system analyses data and actions in the application to drive changes in developer behavior, thereby supporting a productivity loop that measures data and actions (e.g. set a goal) and measures performance to determine whether the goals are being met and provide recommendations for achieving the goal.

Overall System Environment

FIG. 1 shows the overall system environment for monitoring and analyzing source code development processes, according to an embodiment of the invention. The overall system environment comprises development systems 110, cloud based systems 130, computing system 100, administration system 150, and external system 160. Other embodiments may include more, fewer, or different systems than those indicated in FIG. 1. Functionality indicated herein as being performed by a particular system/module may be performed by other systems/modules.

Users, for example, developers and testers, use development systems 110 for performing source code development and testing. A development system may execute one or more applications 115. Some of the applications are for code development, for example, integrated development environment (IDE) for performing various activities related to development including code editing, code debugging, unit testing, and so on. Other applications 115 may be used for various activities that may be related to development or may be unrelated to development, internet browser application for browsing, mail applications for communicating with other users, word processing applications for editing documents, and so on. Some applications, for example, an internet browser can be used for development-related activities, for example, to look up documentation for certain product and can also be used for activities that are not related to development, for example, for checking news, social networking websites, and so on.

Some of these applications may be composite applications that have multiple components, such that each component can be used for one or more specific activities. For example, an IDE can have a code editor used for editing source code, debugger for performing code debugging, code compiler for compiling code, and code analysis tools. Each application or component of an application is used for specific purposes and has a reference rate of user interaction with the application/component. Furthermore, each application/component allows users to interact with the application component via one or more peripheral devices, for example, keyboard, mouse, touch sensitive screen, and so on.

The development system includes a data collection module 120(a) that collects various type of data that is used for analysis by the development analysis system 100. In an embodiment, the development system 110 includes one or more data collection modules 120(a) that are plugins that may be installed in individual applications. The data collection module 120(a) may collect information, for example, the rate at which a user uses certain peripheral devices of the development system while interacting with an application, for example, key board and mouse. The data collection module 120(a) provides information about applications executing on the development system 110, for example, parameters used by the applications, such as URLs that may be used by an internet browser application that can access the internet. In an embodiment, the data collection module 120 stores a list of domain names (or patterns describing domain names) that represent software development related information. The data collection module 120 sends a flag that indicate whether a parameter (e.g., the URL) indicates development related activity or a non-development related activity, for example, browsing news websites. In some embodiments, the development analysis system 100 stores the list of development related domains/URLs/or patterns of domain names. The development analysis system 100 receives the URL from the data collection modules 120 and determines whether the user was performing a development related activity or a non-development related activity. In an embodiment, development score module 210 associates activities with weights, e.g., associating development related activities with a positive weight and activities that are unrelated to development with a negative weight. The development score module 210 uses these weights while determining a weighted aggregate value for computing the development score for a user during a time interval.

The data collection module 120(*a*) may also provide information describing execution of the applications, for example, information identifying the current application that has a user interface that is displayed in the top and is therefore a currently active application, the amount of occlusion of a window of an application indicating a likelihood that the application is being used or not being used.

The development system 110 may interact with a cloud based system 130 that provide services to facilitate the development activities. For example, the cloud-based system 130 may allow development systems 110 to store changes to source codes, maintain various branches of source code and merge branches, tools for code review, and so on. The cloud based system 130 includes a code repository 140 that stores source code obtained from various development systems 110 and maintains versions of source codes. The cloud based system 130 includes a repository interface 135 that allows development systems to interact with the code repository 140. For example, the repository interface 135 allows users to specify instructions including checking in code, checking out code, merging code branches, and so on. The cloud based system includes a data collection module 120(*b*) that allows a development analysis system 100 to obtain data describing various analysis activities, for example, lines of code checked in, various files that were modified during a checking, various users (i.e., developers) associated with a check-in, and so on.

The development analysis system 100 includes various modules including a data aggregation module 170 that aggregates data from various sources including the development systems 110 and cloud based systems 130. In an embodiment, the data aggregation module 170 receives streams of data from various data collection modules 120 and aggregates the information for individual time intervals. For example, a data collection module 120(*a*) may report the total number of keystrokes performed by a user while interacting with an application during each time interval and the data aggregation module 170 determines a rate at which the user is interacting with the keyboard for each application, for example, KPM (keys per minute).

The development analysis system 100 performs analysis of the different type of data collected by the data aggregation module 170 from various data collection modules 120. The development analysis system 100 may generate reports based on the analysis and display the generated reports via user interface 155 of the administration system 150. The development analysis system 100 may also take various actions based on the analysis, for example, schedule tasks using the scheduler 165 of the external system 160. The external system 160 performs tasks based on instructions from development analysis system 100. For example, the external system 160 may have a scheduler 165 that schedules tasks. The development analysis system 100 provides instructions to the external system 160 to schedule tasks based on analysis of the development systems 110. In an embodiment, the scheduler 165 is a calendar application that tracks times of user activities, for example, team meetings. For example, the development analysis system 100 may identify time intervals that correspond to past time intervals of low productivity of developers, and schedule tasks that do not involve development activities such as coding and debugging during such intervals, for example, meetings may be scheduled during such time intervals. In an embodiment, the scheduler schedules tasks such as meetings and receives information from the development analysis system 100 describing whether the meetings are overlapping high productivity time intervals of various users included in the meeting.

The administration system 150 displays various reports based on analysis performed by the development analysis system 100. The reports are displayed via the user interface 155. These may include textual reports as well as graphical visualizations, for example, charts. Examples of various types of charts are further disclosed herein.

The various systems shown in FIG. 1 may interact with each other using a network (not shown in the figure), for example, via the Internet. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

FIG. 1 and the other figures use like reference numerals to identify like elements. A letter after a reference numeral, such as "115(*a*)," indicates that the text refers specifically to the element having that particular reference numeral. A reference numeral in the text without a following letter, such as "115," refers to any or all of the elements in the figures bearing that reference numeral (e.g. "115" in the text refers to reference numerals "115(*a*)" and/or "115(*n*)" in the figures).

System Architecture

Figure 2:
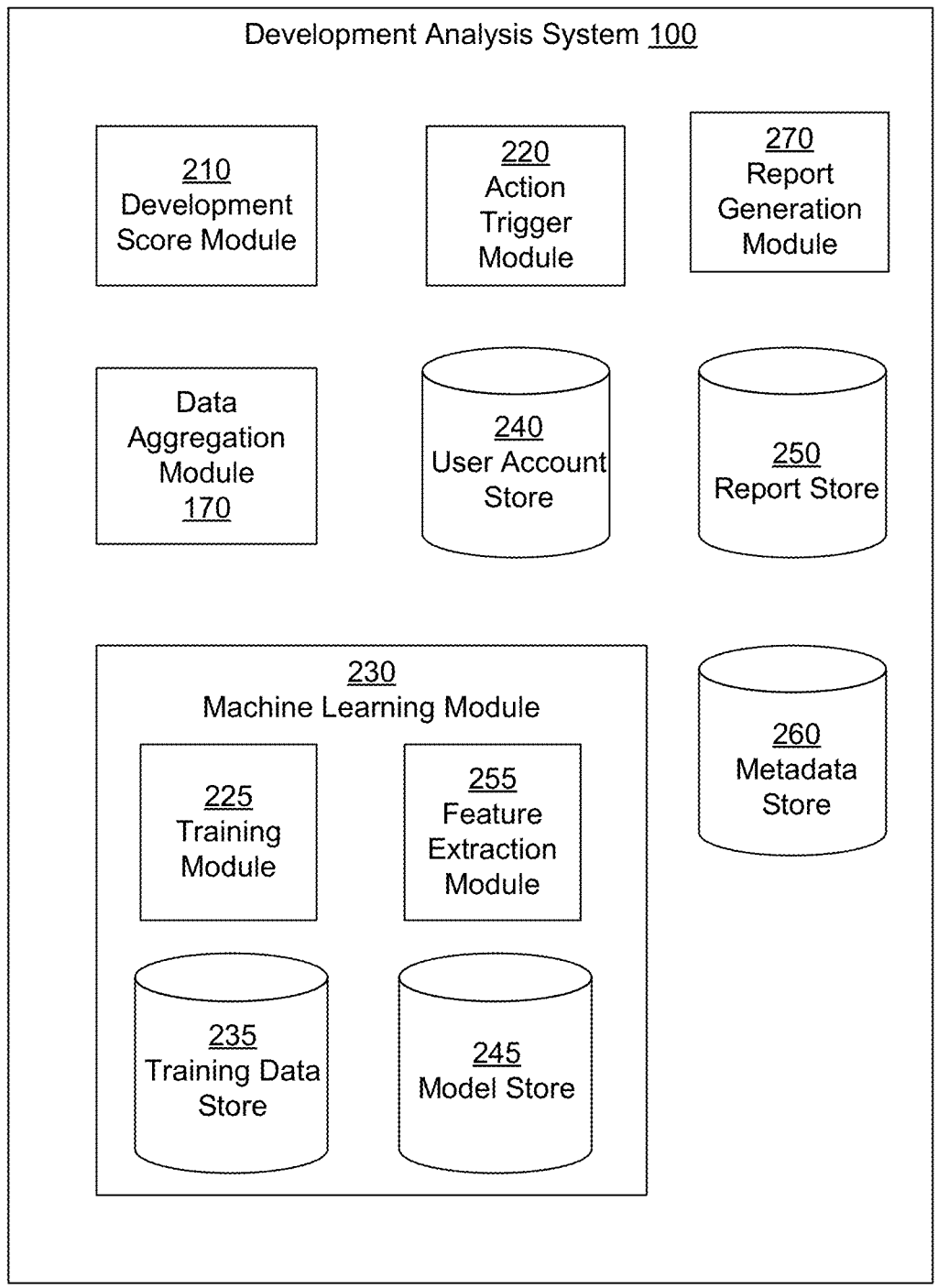
FIG. 2 shows the system architecture of a development analysis system, according to an embodiment of the invention.

FIG. 2 shows the system architecture of a development analysis system, according to an embodiment of the invention. The development analysis system 100 comprises a development score module 210, a machine learning module 230, an action trigger module 220, a report generation module 270, the data aggregation module 170, a user account store 240, a report store 250, and a metadata store 260.

The development score module 210 can automatically determine development scores, according to various embodiments. In an embodiment, the development score module 210 determines development scores for individual users during a time interval indicating a measure of performance of the user during the time interval. For example, a developer may have high development score in the mornings but low development scores in the evening indicating that the developer is more productive in the morning. In some embodiments, the development score module 210 may identify one or more recurring time intervals (e.g., a particular time interval corresponding to a time of day, or a time interval during a particular day of the week), and determine an expected amount of productivity (e.g., development score) associated with the time interval, based upon determined productivity levels for past occurrences of the time interval. For example, the development analysis system 100 may be able to determine that a particular developer typically experiences high productivity during a certain time of day (e.g., between 2 and 3 pm) and/or during certain times of day on particular days (e.g., between 2 and 3 pm on Monday), based upon analysis of development scores of past time intervals. As such, the development score module 210 can infer an amount of productivity of the developer over future time intervals, and may be able to perform actions, such as scheduling tasks, based upon the expected productivity of the developer over a future time interval.

In an embodiment, the development score module 210 determines development scores for code checked in for a file or a set of files associated with a feature. Accordingly, if the code check-in results in significant amount of code rewrite for the code checked in or if the code check-in results in multiple defects associated with the check-in, the code check-in has low development score (or a development score value indicating low quality of code check-in). Alternatively, if the code check-in requires very little rewrite and results in very few defects, the code check-in has high development score (or a development score value indicating high quality of code check-in).

In an embodiment, the development score module 210 uses machine learning based models trained using the machine learning module 230 for determining the development scores. The machine learning module 230 includes other modules, for example, a training data store 235 for storing training data sets for models, a training module 225 for training models using the training data sets stored in the training data store 235, a feature extraction module 255 for extracting features for providing as input to a model, and a model store 245 for storing trained models. In an embodiment, the models trained by the machine learning module 230 are neural networks, for example, recurrent neural networks.

The action trigger module 220 performs various actions that may be triggered based on development scores of individual developers or teams of developers. The action trigger module 220 may perform scheduling of a task, for example, a meeting involving a group of users. The action trigger module 220 identifies a time interval matching a low development score for the group of users participating in the activity and either recommends the time interval for scheduling the meeting or sends commands to a calendar application to schedule the meeting.

In some embodiments, the action trigger module 220 controls settings of one or more development system or devices associated with a user based on the development score values. For example, if the development analysis system 100 determines that a particular time period corresponds to high development score (indicative of high productivity for the user), the action trigger module 220 shuts off notifications for the user based on various applications executing on the device/development system. For example, the action trigger module 220 turns off notifications from a mail/newsfeed program/messenger during that time interval or sends signal to a mobile device to switch to silent mode thereby causing the mobile device to either withhold notifications or report notification without making sound. In an embodiment, the action trigger module 220 sends signals to a mobile device to turn on airplane mode if the development analysis system 100 indicates that the user has high productivity during the time interval. In some embodiments, the action trigger module 220 disables certain functionality of applications during a time interval indicating high productivity, for example, by turning off access to social media websites. Alternatively, if the development system determines that a particular time interval has low development score indicating low productivity for a user, the action trigger module 220 turns normal mode (that is not silent) for various applications and optionally may send signal to a device to turn on music, enable notifications, and so on. In some embodiments, the action trigger module 220 sends alerts recommending these actions be performed rather than performing them without approval. The action trigger module 220 waits for approval from the user before making changes to system/application settings. In some embodiments, the action trigger module 220 sends an alert with some information, for example, a data story, a report, or any other format for reporting information indicating that for a particular time interval the user had below/above threshold development score, thereby informing the user (or another user) of the level of productive activity of the user.

In an embodiment, the action trigger module 220 is a rule based system storing rules comprising certain conditions and associated actions that need to be performed responsive to determining that the condition is true. For example, a condition may become true if the development score of a user during a time interval exceeds an aggregate value or is below a certain threshold. The action triggered by a rule may be any of the above actions (or another action), for example, sending an alert, rescheduling a task, blocking certain time interval so that no meetings are scheduled during that time, sending an alert indicating that a scheduled meeting interferes with a high productivity time of a user or group of users, and so on.

Overall Processes

Figure 3:
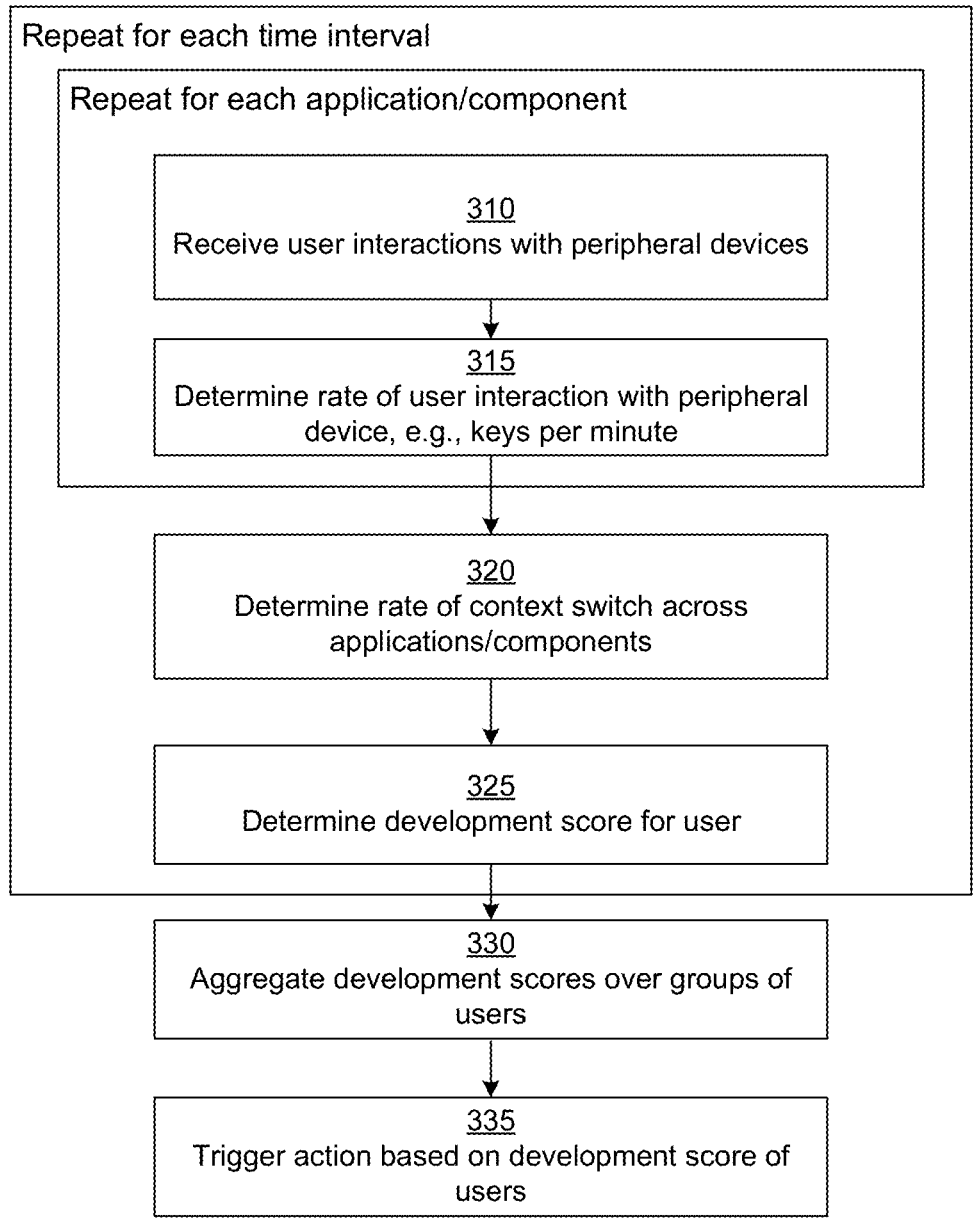
FIG. 3 shows the overall process for monitoring source code development processes, according to an embodiment of the invention.

FIG. 3 shows the overall process for monitoring source code development processes, according to an embodiment of the invention. The steps shown in the flowchart may be executed in an order different from that indicated. For example, certain steps may be executed in parallel. The steps may be performed by modules other than those indicated herein.

The following steps 310, 315, 320, and 325 are repeated multiple times, for example, periodically. The development system 110 may execute multiple applications 115. An application may have different components that provide different functionality.

The data aggregation module 170 receives 310 user interactions with peripheral devices associated with various applications or components of applications. The data aggregation module 170 may receive streams of data from various data collection modules executing on various development systems. For example, the stream of data may comprise data values received periodically that represent a number of user interactions with a peripheral device performed by a developer while interacting with a particular application via client device during a time interval. The peripheral devices may be keyboards, mouse, or any other peripheral device that is used to interact with an application.

The development score module 210 determines 320 rates of user interactions with the various devices over a given time interval. For example, the data aggregation module 170 may determine a rate of interaction over larger time intervals compared to the time intervals for which data is received from data collection modules, for example, per minute, over several minutes, or on an hourly basis.

The development score module 210 determines various metrics based on flow time representing a measure of an amount of time a developer is actively coding—spending typing on a keyboard inside a source code editor or IDE. The development score module 210 determines various types of metrics based on ratios, for example, flow time ratio (ratio of flow time to total session time for measuring quality vs. quantity of time spent coding), net code ratio (ratio of net code to total code (including rework and deleted code) for measuring quality vs. quantity of lines of code), total time to net code (productivity or happiness ratio), total code to net code (code productivity), net code to total issues/tasks/function or story points (code efficiency ratio), and so on.

The development score module 210 determines 320 the rate at which a user performs context switches across various applications executing on the client device. The development score module 210 identifies a context switch if the user switches from interacting with a particular application to interacting with a different application. For example, if the user is working on an application A1 that allows debugging during a first time interval and starts interacting with an application A2, for example, an interne browser, in a subsequent time interval, the development score module 210 identifies a context switch from the application A1 to application A2.

In an embodiment, the development score module 210 normalizes the rates of user interactions based on historical data describing user interactions with specific applications. The development score module 210 determine reference rates for each application or components of an application representing the typical rate of user interaction with the application/component using a particular peripheral device. The reference rate is determined based on aggregate rates of users interactions computed over several users and several time intervals. For example, the reference rate at which a user interacts with a code debugger tool may be different from the typical rate at which a user interacts with a code editing tool or with an internet browser. The development score module 210 uses the reference rate for an application/component to normalize the rate of user interaction for a particular user to determine whether the rate of user interaction is above or below the reference rate.

The development score module 210 determines 325 a development score for the user for a given time interval. In an embodiment, the development score module 210 determines the development score by determining a weighted aggregate of various factors including rates of user interactions with different applications. In an embodiment, the development score module 210 determines the development score by determining a weighted aggregate of normalized rates of user interactions with different applications. The development score module 210 may consider other factors such as rate of context switch between applications by a user during a time interval. In an embodiment, the development score module 210 determines reference rates of context switch between pairs of applications based on historical data. The development score module 210 uses the reference rates of context switch between pairs of applications to normalize rates of context switch for a particular user during a time interval to determine whether the rate of context switch for that particular user is above or below the reference rate.

The development score module 210 may aggregate 330 the development scores for users over groups of users. For example, the development score module 210 may aggregate 330 the development scores for a team of developers working on a project to determine a cumulative development score for the team. The development score module 210 may aggregate 330 the development scores across an entire organization to determine a cumulative development score for the organization. The development score module 210 may aggregate 330 the development scores across an industry to determine a cumulative development score for the industry, for example, across all organizations working on a particular type of technology such as blockchain, online retail, or big data.

The system captures end-to-end productivity data about software development tools, for example, languages (JAVASCRIPT, PYTHON, etc.), frameworks (NODE, REACT, etc.), software development tools (JIRA, GITHUB, SLACK, etc.). The system collects data from various developers and possibly across various organizations. The system aggregates data collected from development systems across various dimensions. The system determines metrics describing productivity for various tools (e.g., editors, IDEs etc.), locations, education level of developers, operating systems used, to make recommendations for users for improving their productivity. The system uses the analysis to help developers pick right tools (that provide the highest productivity for the developer).

The system can provide an automatic or manual selection to narrow down the data to a smaller subset to improve the fitness of the data. For example, a target user can drill down various metrics to determine a metric for a set of users that best matches the target user. This represents the productivity data that the system generates for each tool, framework, programming language, and the like. The generated productivity data for each tool allows developers and teams to choose their tools. The system allows developers to extend the data with comments, up-votes, or by adding other productivity data from other sources. The system also receives user profile information from developers, so as to allow the system to develop various types of reference classes corresponding to different types of users, for example, the set of users in the aerospace industry or the set of python developers in Silicon Valley, or the set of web developers with graduate degrees.

The development analysis system 100 uses the aggregate scores across groups of users to be able to compare development scores of individual users with aggregate values to determine how they compare with the group. In an embodiment, the development analysis system 100 determines an aggregate score for a particular user determined over a time interval based on historical data. The development analysis system 100 uses the historical aggregate development score for the user with development score over an interval (for example, a current time interval) to determine how the user is performing compared to the user's historical aggregate development score value.

The action trigger module 220 performs one or more actions that may be triggered based on values of development scores of individual users or groups of users. For example, the action trigger module 220 may adjust the timing of a meeting based on development scores of the participants of the meeting to schedule the meeting during a time interval that indicates an aggregate development score value below a threshold, for example, below an average development score value. The action trigger module 220 may trigger other types of actions described herein.

As an example, the system monitors time spent in a text editor, along with lines of code in software version control tools or code repositories. The system uses the monitored information to establish a ratio of (1) metric measuring time spent to (2) a metric measuring net code. The system uses the determined ratio to make a recommendation to set a developer goal to improve the ratio, so as to make the developer more time efficient. The system can track the performance before and after the goal is set, and trigger various actions that help a developer achieve a target goal.

Figure 4:
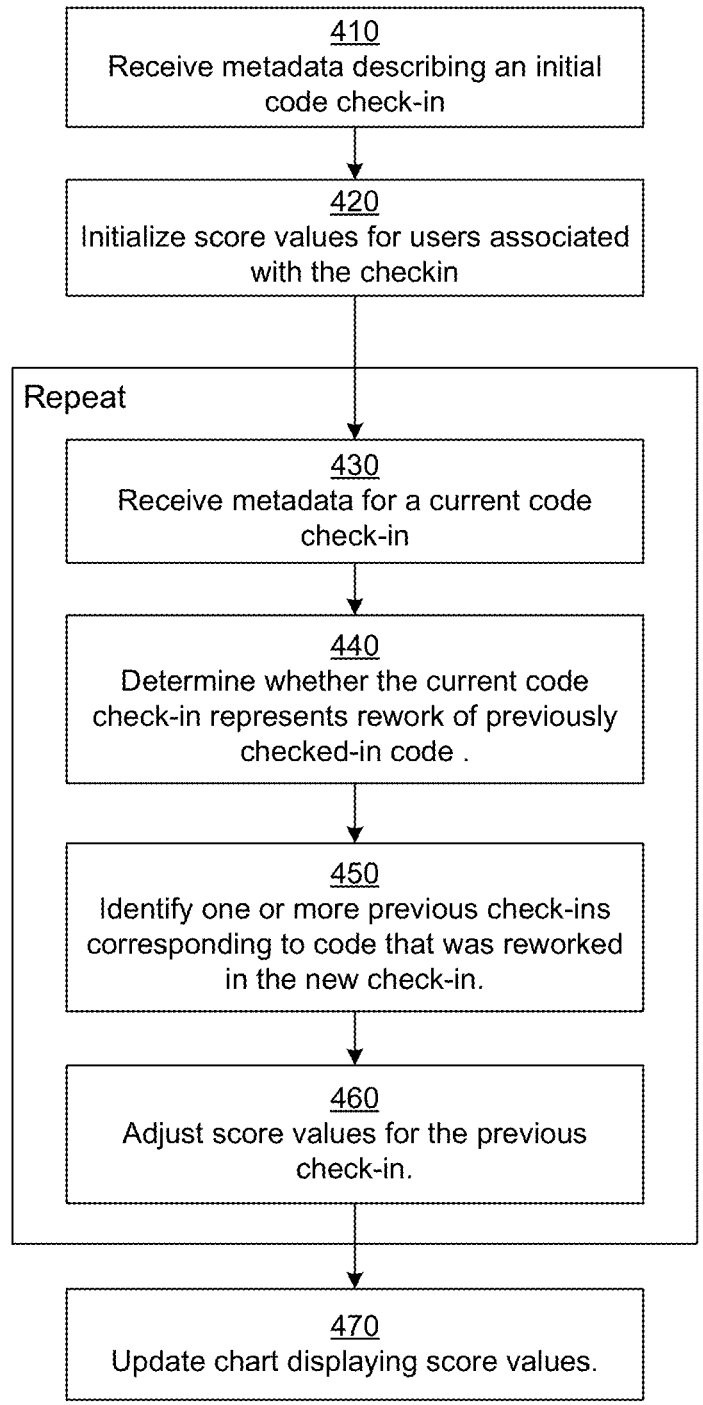
FIG. 4 shows the overall process for determining quality of code checked-in, according to an embodiment of the invention.

FIG. 4 shows the overall process for determining quality of code checked-in, according to an embodiment of the invention.

The development analysis system 100 receives 410 metadata describing an initial code check-in, for example, a check-in of a new file or an early check-in in a new release of a feature. The information may comprise a set of files that are updated in the check-in, information describing the user (e.g., developer) that made the changes, and information describing the amount of changes, for example, the lines of code in each file that changed. The development analysis system 100 may receive the information describing the code check-in from a source code version control system or any application that maintains a source code repository and allows users to update files in the source code repository. The development analysis system 100 stores the metadata in the metadata store 260.

The development score module 210 initializes 420 score values for users associated with each check-in if the user was not associated with a previous score value. If the user is associated with a previous score value, the development score module 210 updates the score value based on the new check-in. The score for a user is determined based on an amount of code changes made by the user. For example, the score value is directly related to the number of new lines checked in or number of lines updated by the user, assuming that the lines were provided previously by another user.

The development analysis system 100 may repeat the steps 430, 440, 450, and 460, for example, for each code check-in that is performed. The development analysis system 100 receives 430 metadata describing a current code check-in. The development analysis system 100 determines 440 whether the new code check-in corresponds to a rework of a previously checked-in code or represents new code. For example, the development analysis system 100 may determine that an update to a file by a particular user U1 is a rework, if the lines updated were previously checked-in as new code by another user U2. Accordingly, the development analysis system 100 identifies 450 one or more previous check-ins corresponding to code that was reworked in the current check-in. The development analysis system 100 determines the other user U2 assigned to the previous check-in such that the previous check-in is considered a new check-in of the other user U2. Accordingly, the development analysis system 100 determines that the current check-in by user U1 is a rework of the previous check-in by the other user U2 if there is more than a threshold overlap in the lines of code that were updated in the previous check-in and the current check-in.

The development analysis system 100 adjusts 460 development scores associated with the previous check-ins based on the current check-in. In some embodiments, the development analysis system 100 assigns negative weight to any rework performed for a code. Accordingly, the adjusted development score for the previous check-in is decreased responsive to any rework performed to that check-in. The development score may be adjusted by an amount that is directly related (e.g., directly proportionate) to the number of lines of code that were reworked.

In an embodiment, the development score is adjusted by an amount that is directly related to the time difference between the previous check-in and the new check-in. This is so because the current update is determined to reflect a defect in the previous check-in that was hard to find. In an embodiment, each defect is associated with a severity as reported by the source code version control system. The development analysis system 100 adjusts the weight of the development score based on the severity associated with the check-in. For example, a defect identifying change in a log statement is typically lower priority compared to defect identifying a fatal a crash in a system. Accordingly, a rework corresponding to the rework fixing the fatal crash causes a large adjustment to the development score of the code check-in that introduced the defect as a result of a new check-in.

The development analysis system 100 determines the development score for a user, for example, as an aggregate value based on development scores associated with various check-ins performed by the user. The development analysis system updates 470 charts describing and visualizing development scores for one or more users as the development scores are adjusted for each new check-in.

In an embodiment, the development analysis system 100 weighs different portions of code that is checked in differently based on an estimate of complexity of the code. A portion of a code may be characterized using boundaries based on various criteria. For example, a portion of code may represent the code in one or more files, or one or more classes of an object-oriented language such as C++ or Java, or one or more functions. The development analysis system 100 determines the statistics related to code check-ins over time. For example, the development analysis system 100 determines the average amount of code updated or added in a check-in by aggregating the data over several check-ins. For example, some code may be more difficult to develop and accordingly each check-in may have only small amount of new/updated code even though the developer may have put in significant amount of development effort towards the check-in. Similarly, some code may be easy to develop and large amount of code updates/new code may not require significant development effort. The development analysis system 100 normalizes different portions of code based on historical data by applying a scaling factor that is indicative of the amount of effort required for developing code of that module/portion of code.

In an embodiment, the development analysis system 100 analyzes the code to classify the code as one of several categories of code. The development analysis system 100 analyzes the code by identifying previously known library calls made in the code to classify the code. For example, code containing calls to user interface libraries is classified as a category of user interface code, whereas code containing calls to web server libraries is classified as a category of webserver code.

Machine Learning Based Models

The machine learning module 230 trains machine learning based models for performing various tasks. In one embodiment, the machine learning module 230 trains models for determining development scores for users. The development score is predicted based on various features associated with a user over a period of time, such as the rate of user interactions with peripheral devices (e.g., keystrokes per minute) by a particular user while interacting with various applications, a rate of context switch between various applications, one or more parameters associated with code interacted with by the user during the time period (e.g., a classification or complexity of the code), one or more reference rates associated with various applications, etc. The development analysis system identifies a context switch from application A1 to application A2 when the rate of user interaction via peripheral devices with one of the applications drops below a threshold value (e.g., a first threshold value) and the rate of user interaction via peripheral devices with the other application increases above a threshold value (e.g., a second threshold value). The development analysis system identifies the number of context switches within a time interval and determines the rate of context switching between applications based on the number of context switches and the size of the time interval (e.g., as the ratio of the number of context switches to the size of the time interval). The machine learning model is configured to take features describing the user interactions via peripheral devices for a user during a time interval, and determines the development score for the user for that time interval. The development analysis system may use the development score to take various actions, for example, to determine whether a task should be scheduled during a particular time interval or certain action should be triggered by the action trigger module 220. In some embodiments the machine learning module is trained to predict a score associated with specific actions triggered by the action trigger module. Accordingly, the score indicates whether the action should be performed. The development analysis module determines based on the score, whether to perform an action of the action trigger module. For example, if the score is above a threshold value (or below a threshold value), the development analysis performs a particular action of the action trigger module 220 (e.g., schedule a task to not overlap with the time interval, enable or disable certain settings of a system used by the developer during the time period, etc.).

In an embodiment, the machine learning based model is a neural network. For example, the machine learning based model is a recurrent neural network (RNN) that takes vectors describing rates of user interactions with various applications periodically and predicts the development score (or a score indicating whether an action should be performed by the action trigger module 220). The vector provided as input to the recurrent neural network stores an element representing rate of user interaction with a particular peripheral device for an application executing on the development system. Accordingly the vector may store K×M elements representing user interactions with applications via peripheral devices, where K is the number of peripheral devices and M is the number of potential applications that can execute on the development system. The vectors are computed for each subsequent time interval (for example, every minute or every 10 seconds) and provided as input to the RNN. The RNN computes the development score over a larger time interval, for example, over an hour.

In an embodiment, a machine learning based model predicts a score indicating whether an action should be performed by the action trigger module 220 based on lines of code checked in by users as part of various check-ins. The machine learning based model is provided features representing the number of lines added or updated in each check-in by a particular user and number of lines that are reworked (i.e., updated by other users or by the particular user after a new code check-in) and deleted (by the particular user or other users) across a plurality of check-ins. In an embodiment, the machine learning based model predicts a score value indicating a development score value for a user based on the lines of code checked-in by various users during a time interval. In one embodiment, the machine learning based model predicts a score indicating a likelihood of completion of a feature or project at an expected date.

In an embodiment, the machine learning model is a neural network, for example, a recurrent neural network RNN that is configured to take as input vectors describing code check-ins. For example, the vector includes a tuple corresponding to each file, the tuple storing a number of lines check-ed in, whether the lines checked in represent new code, reworked code, or code deleted, and a time of check-in (or an indication of the length of the time interval representing delay when a rework was performed after the corresponding new code check-in). A vector is encoded provided as input to the RNN for each code check-in performed.

A model may be trained for an organization if there is sufficient training data, for example, for an organization that has existed for a long time and for code bases that have existed for a long time. A model may be trained for each category of software (for example, user interface software, web applications, server-side programming, and so on) based on data obtained from various groups/companies working on the type of software. In some embodiments, training data based on a plurality of companies/groups developing software of a particular category is used to develop an initial model that is further trained using training data specific to a group or a company as more data is available.

User Interface

Figure 5:
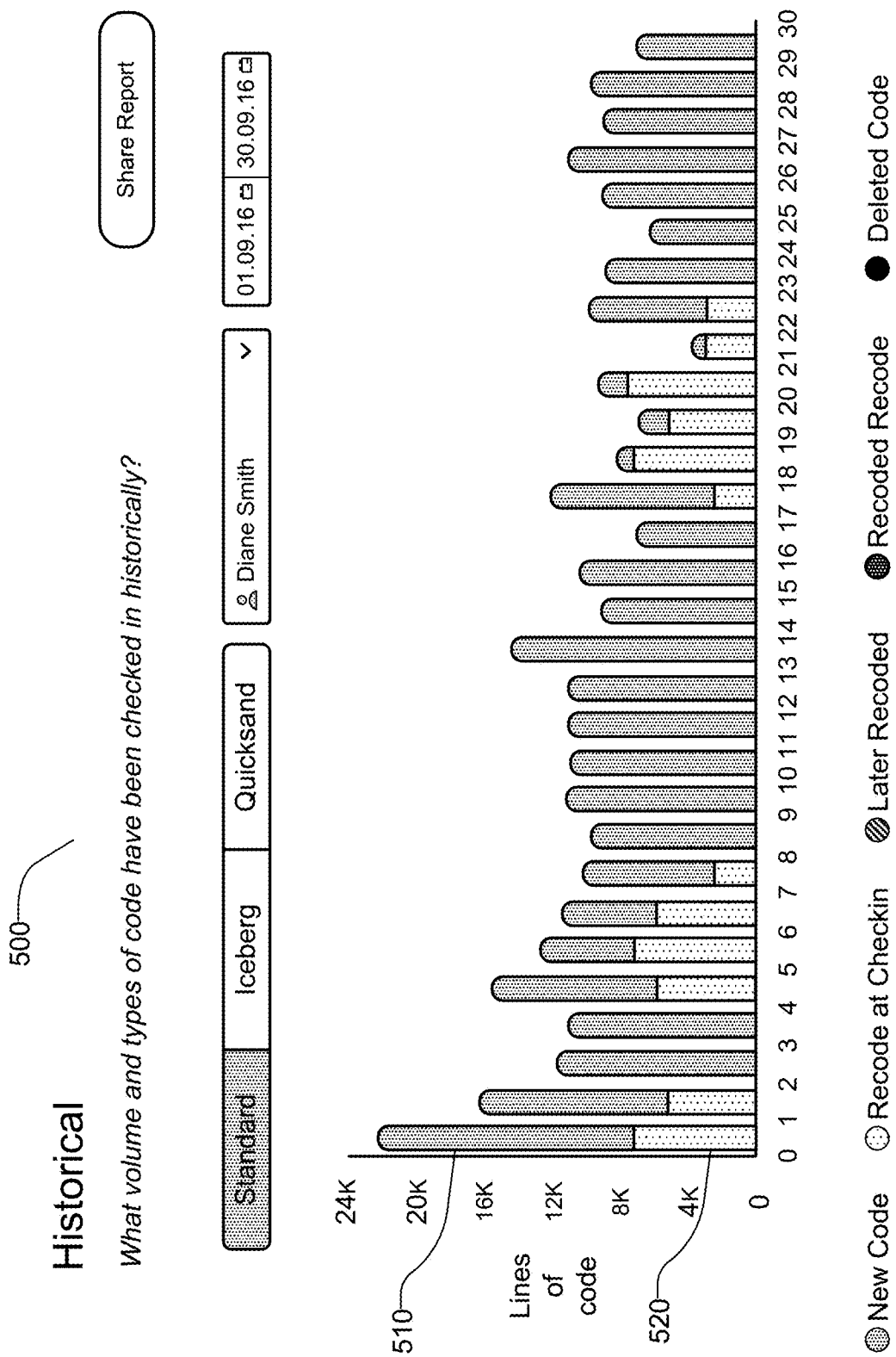
FIG. 5 shows a user interface showing a visual representation of code check-in, according to an embodiment.

FIG. 5 shows a user interface showing a visual representation of code check-in, according to an embodiment. The chart 5000 shows the amount of code and the type of code checked in by a user over time (wherein the amount of code is shown along the Y-axis and the time is shown along X-axis). The types of code include, new code, reworked code (recode of new code or recode of code that was previously recoded), deleted code, and so on. Each bar represents the amount of code checked-in during a time interval. Each bar has different sections, for example, section 520 and 510, each section representing code of a particular type. The chart shows different types of code for each section based on different colors or shading. For example, as illustrated in FIG. 5, section 520 may correspond to reworked code (recode of new code), while section 510 may correspond to new code.

Figure 6:
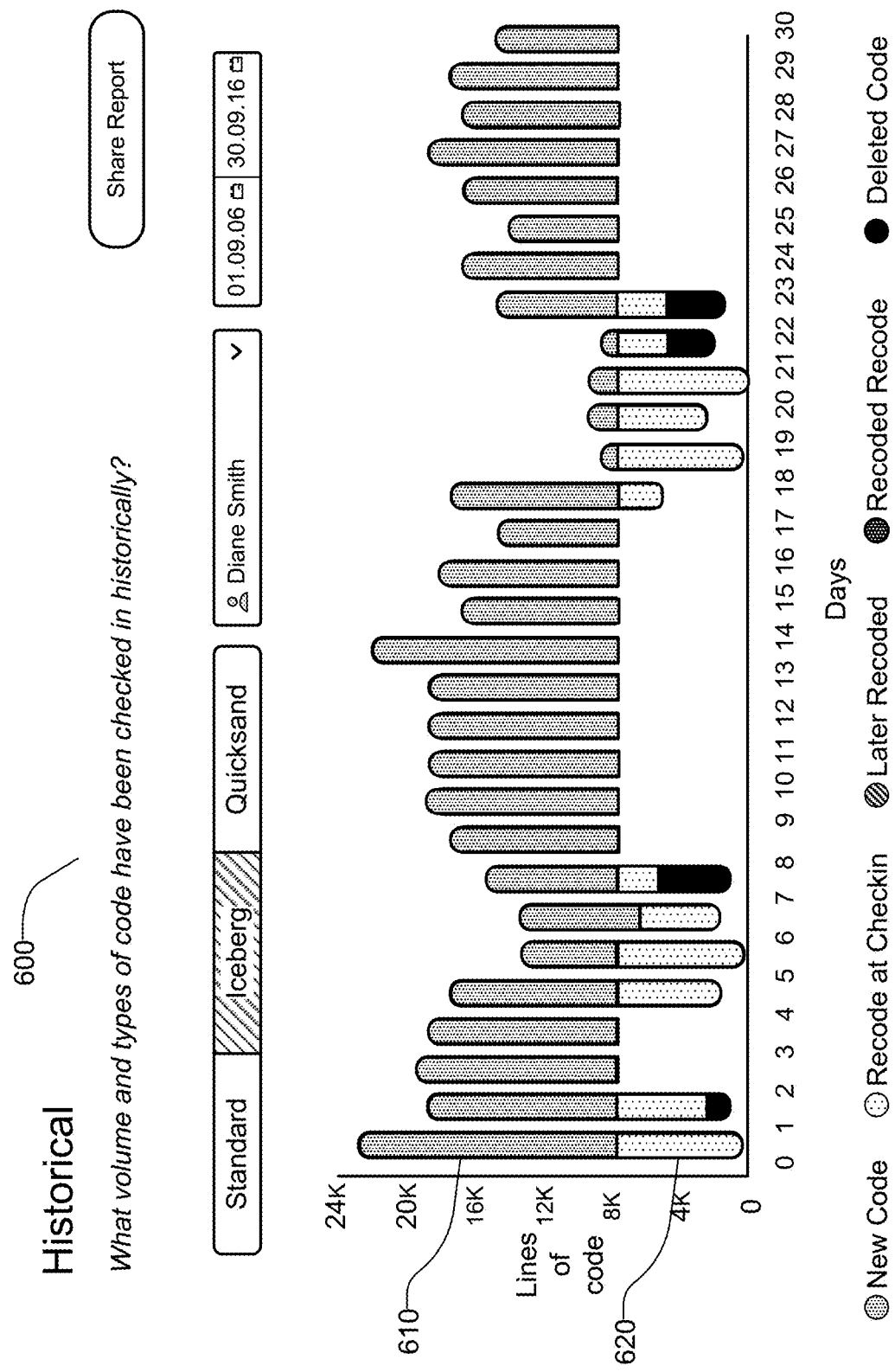
FIG. 6 shows a user interface showing a visual representation of subsequent code check-in, according to an embodiment.

FIG. 6 shows a user interface showing a visual representation of subsequent code check-in, according to an embodiment. The chart 600 shows types of code representing positive work (for example, new code) as sections 610 of the bar above the X-axis. The chart 600 shows types of code representing negative work (for example, new recode of new code or deleted code) as sections 620 of the bar below the X-axis.

Figure 7:
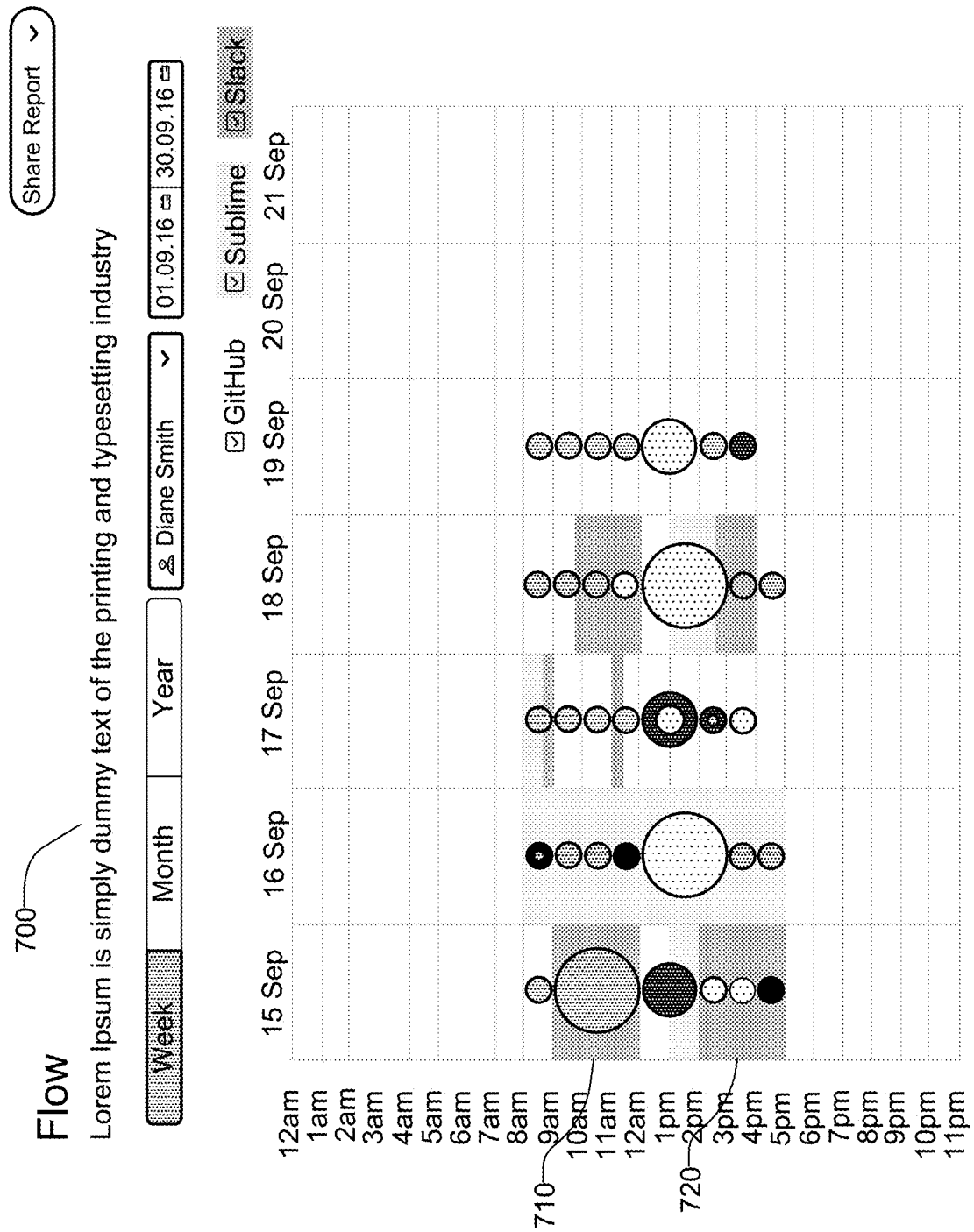
FIG. 7 shows a user interface showing a visual representation of productivity of a developer, according to an embodiment.

FIG. 7 shows a user interface showing a visual representation of productivity of a developer, according to an embodiment. The Y-axis represents various time intervals during a day and the X axis represents days. The chart 800 displays geometric shapes, for example, circles representing an amount of work associated with a check-in, for example, number of lines of code representing new code or reworked code. The color of the shape or a shading of the shape indicates the type of code in the check-in (e.g., new code or reworked code). Accordingly, the circle 710 represents new code and circle 720 represents reworked code. Furthermore the amount of changes represented by circle 710 are more than the amount of changes in circle 720 as indicated by the size of the circle. The chart 700 allows a viewer to determine time intervals that represent high productivity for a user. The charts 600 and 700 are also referred to as quicksand reports.

Figure 8:
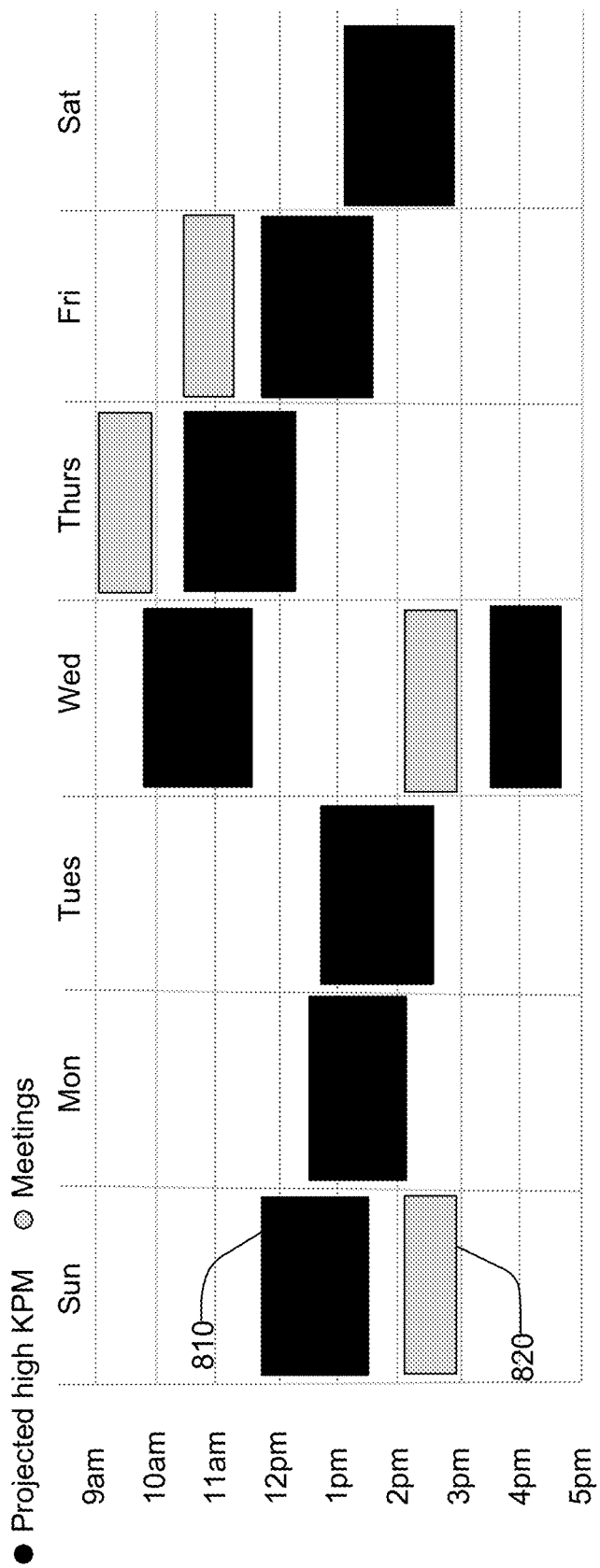
FIG. 8 shows a user interface showing a visual representation of productivity of a developer in combinations with a task schedule, according to an embodiment.

FIG. 8 shows a user interface showing a visual representation of productivity of a developer in combination with a task schedule, according to an embodiment. The user interface 800 shown in FIG. 8 illustrates a calendar but could instead show any type of task schedule associated with developers, for example, schedule of maintenance of developer systems, schedule of backup of data, schedule of travel, and so on. The X-axis shows the days of the week and the y axis shows the time of the day. The darkly shaded shapes 810 (rectangles) show the times of the day when the developer metrics show highest productivity and the lightly shaded shapes 820 (rectangles) show schedule of some other task that is not development related. In some embodiments, the times of the day when the developer metrics show highest productivity (represented by the shapes 810) are identified based upon amounts of productivity determined for the developer over one or more previous time intervals. By analyzing historical productivity values over previous time periods, expected productivity over future time periods can be inferred. For example, as illustrated in FIG. 8, a period of time corresponding to between 12:30 pm and 2 pm on Mondays is determined to be a time interval of expected high productivity for the developer, which may have been determined based upon measured scores for the developer over the time interval over previous weeks.

The user interface shows both the high productivity time periods and the non-developer related tasks in the same calendar to highlight any time periods where the two overlap. The non-development tasks can be manually modified to not overlap the high productivity areas of the developer or the system can automatically reschedule them. Alternatively, the system can propose alternative times for scheduling the non-development tasks and wait for approval by a user to confirm the modified task schedule. In some embodiments, the system, when scheduling a new task (e.g., a non-development task), may automatically schedule the new task to a time that does not overlap with a determined period of expected high productivity for the developer.

Figure 9:
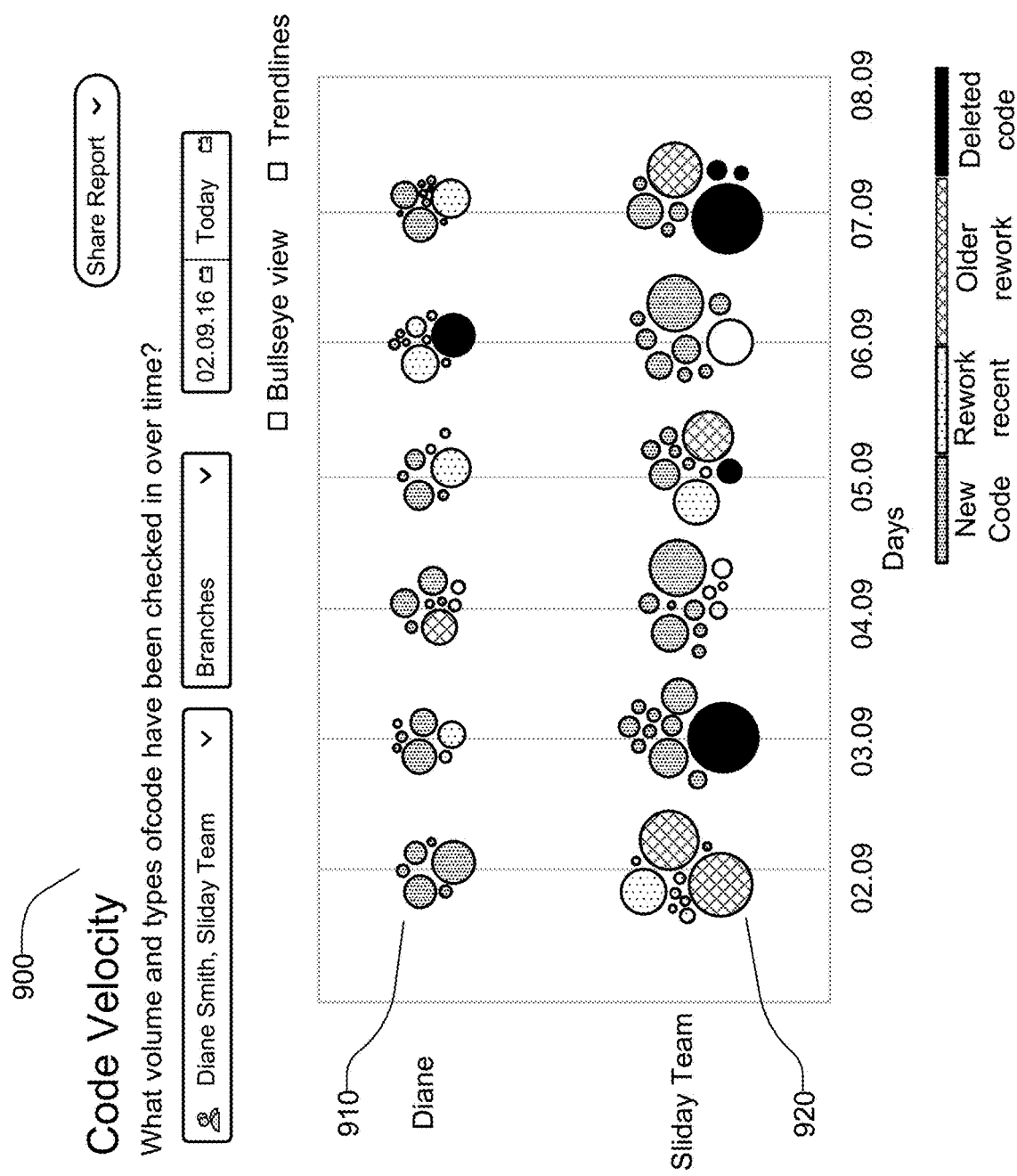
FIG. 9 shows a user interface showing a visual representation of comparison of productivity of a developer with a group of developers, according to an embodiment.

FIG. 9 shows a user interface showing a visual representation of comparison of productivity of a developer with a group of developers, according to an embodiment. The chart 900 displays a set of geometric shapes representing a set of check-ins performed during a time interval. Each check-in is represented by a geometric shape such that the size of the shape is proportionate to the amount of work (e.g., lines of code) corresponding to the check-in and the color (or shading or another attribute) of the shape represents the type of code that is predominant in that check-in (e.g., new code, reworked code, etc.). A first set of shapes 910 represents check-ins of a particular user and a second set of shapes 920 represent an aggregate value, for example, check-ins performed by a team for comparison. As such, the activity and/or productivity of a particular user can be easily compared with the activity and/or productivity of a team over different time periods. In some embodiments, the interface 900 may further indicate whether code submitted by the particular user (e.g., new code or reworked code) is later reworked or deleted (by the user or a different user), potentially providing additional insight into the productivity of the user.

Thus, as described above, by tracking various features of user activity, the development analysis system can determine (e.g., using a machine learning model) metrics for users (e.g., developers) or groups of user (e.g., teams) indicative of a quality of development or productivity during various time periods. In addition, determined development metrics for past time periods can be used to infer levels of productivity for future time periods, allowing for a viewing user to be able to determine over what time periods various developers are expected to be most productive. In addition, by identifying expected time intervals of productivity, actions can be performed based upon a user's expected productivity in order to maximize their productivity during those time intervals.

Computing Machine Architecture

Figure 10:
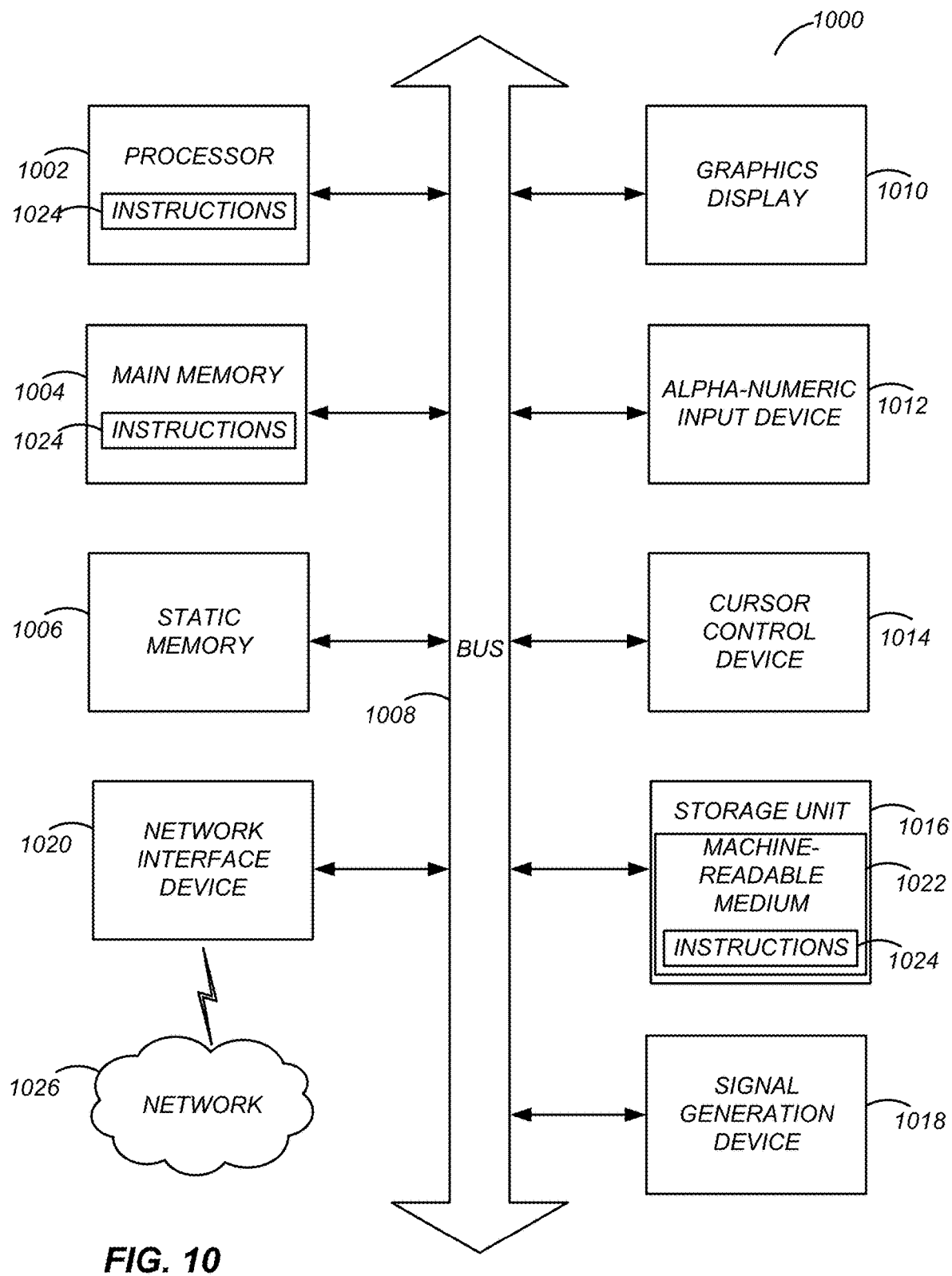
FIG. 10 illustrates an embodiment of a computing machine that can read instructions from a machine-readable medium and execute the instructions in a processor or controller.

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for monitoring and analyzing development processes. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for automatically adjusting user device settings based upon expected user productivity, the method comprising:

receiving, by a processor of a computing system, information describing a plurality of code check-ins performed in a code repository;

determining, by the processor of the computing system, a plurality of score values based on the plurality of code check-ins using a machine learning model trained using a training set comprising a plurality of input vectors corresponding to parameters of respective code check-ins, each score value associated with a respective set of code check-ins of the plurality of code check-ins and indicative of a quality of code check-ins for the respective set of code check-ins, and storing the plurality of determined score values in a memory;

receiving, by the processor of the computing system, information describing a new code check-in, the information describing whether the code checked in during the new code check-in represents original code or reworked code;

responsive to determining that the new code check-in represents reworked code, identifying, by the processor of the computing system, one or more previous code check-ins of the plurality of code check-ins associated with the reworked code;

for each of the identified one or more previous code check-ins:
  identifying a set of code check-ins that includes the previous code check-in,
  adjusting the score for the identified set of code check-ins stored in the memory, in which the adjusted score represents a reduced quality of code check-ins of the set compared to the score prior to the adjustment;

configuring, by the processor of the computing system, a user interface for displaying scores indicative of the quality of code check-ins performed for each of the plurality of sets of code check-ins;

identifying, by the processor of the computing system, a future time interval based upon a first set of code check-ins of the plurality of code check-ins, wherein the score for the first set meets a threshold value; and responsive to identifying the future time interval based upon the first set of code check-ins having a score meeting the threshold value, triggering an action by the processor of the computing system comprising:
  identifying, by the processor of the computing system, a device of a particular user associated with the first set of code check-ins; and
  automatically transmitting instructions to the identified device to cause the identified device to adjust a setting of the identified device to change a functionality of the identified device during the future time interval.

2. The method of claim 1, wherein a set of code check-ins represents code check-ins performed during a time interval.

3. The method of claim 1, wherein a set of code check-ins represents code check-ins performed by one of:
the particular user, or
a team of users including the particular user.

4. The method of claim 1, wherein a set of code check-ins represents code check-ins performed in a module being developed, wherein the repository stores code for a plurality of modules.

5. The method of claim 1, wherein the score for a set of code check-ins is determined by aggregating a measure of quality associated with each code check-in of the set.

6. The method of claim 5, wherein the measure of quality associated with a code check-in is directly related to an amount of code checked in during the code check-in.

7. The method of claim 5, wherein the measure of quality associated with a code check-in is adjusted based on a predetermined factor indicative of a complexity of a module in which the code is checked in.

8. The method of claim 1, wherein adjusting the score for the identified set of code check-ins comprises:
adjusting a measure of quality for the previous code check-in to indicate a decrease in quality of the previous code check-in, wherein the size of adjustment of the measure of quality is determined based on the amount of code reworked in the new code check-in.

9. The method of claim 1, wherein the user interface is configured to show one or more geometric shapes for each set of code check-ins, each geometric shape representing an aggregate measure of quality of code check-ins belonging to the set.

10. The method of claim 9, wherein a geometric shape corresponding to a set of code check-ins displays an indication of the quality of code check-ins of the set of code check-ins, the indication of the quality of code check-ins adjusted based on subsequent rework performed on code associated with a code check-in.

11. The method of claim 9, wherein a geometric shape corresponding to a time interval displays an indication of the amount of rework performed on code associated with a code check-in.

12. The method of claim 9, wherein a geometric shape corresponding to a time interval displays an indication of the amount of code deleted from the code associated with a code check-in.

13. A computer-implemented system comprising:
a computer processor; and
a computer-readable storage medium storing computer program modules configured to execute on the computer processor, the computer program modules comprising instructions for, executing on the computer processor:
receiving information describing a plurality of code check-ins performed in a code repository;
determining a plurality of score values based on the plurality of code check-ins using a machine learning model trained using a training set comprising a plurality of input vectors corresponding to parameters of respective code check-ins, each score value associated with a respective set of code check-ins of the plurality of code check-ins and indicative of a quality of code check-ins for the set of code check-ins, and storing the plurality of determined score values in a memory;
receiving information describing a new code check-in, the information describing whether the code checked in during the new code check-in represents original code or reworked code;
responsive to determining that the new code check-in represents reworked code, identifying one or more previous code check-ins of the plurality of code check-ins associated with the reworked code;
for each of the one or more previous code check-ins:
identifying a set of code check-ins that includes the previous code check-in,
adjusting the score for the identified set of code check-ins stored in the memory, in which the adjusted score represents a reduced quality of code check-ins of the set compared to the score prior to the adjustment;
configuring a user interface for displaying scores indicative of the quality of code check-ins performed for each of the plurality of sets of code check-ins;
identifying a future time interval based upon a first set of code check-ins of the plurality of code check-ins, wherein the score for the first set meets a threshold value; and
responsive to identifying the future time interval based upon the first set of code check-ins having a score meeting the threshold value, triggering an action by the computer processor comprising:
identifying a device of a particular user associated with the first set of code check-ins; and
automatically transmitting instructions to the identified device to cause the identified device to adjust a setting of the identified device to change a functionality of the identified device during the future time interval.

14. A non-transitory computer program product having a computer-readable storage medium storing computer-executable code comprising instructions for:
receiving, by a processor of a computing system, information describing a plurality of code check-ins performed in a code repository;
determining, by the processor of the computing system, a plurality of score values based on the plurality of code check-ins using a machine learning model trained using a training set comprising a plurality of input vectors corresponding to parameters of respective code check-ins, each score value associated with a respective set of code check-ins of the plurality of code check-ins and indicative of a quality of code check-ins for the respective set of code check-ins, and storing the plurality of determined score values in a memory;
receiving, by the processor of the computing system, information describing a new code check-in, the information describing whether the code checked in during the new code check-in represents original code or reworked code;
responsive to determining that the new code check-in represents reworked code, identifying, by the processor of the computing system, one or more previous code check-ins of the plurality of code check-ins associated with the reworked code;
for each of the identified one or more previous code check-ins:
identifying a set of code check-ins that includes the previous code check-in, adjusting the score for the identified set of code check-ins stored in the memory, in which the adjusted score represents a reduced quality of code check-ins of the set compared to the score prior to the adjustment;

configuring, by the processor of the computing system, a user interface for displaying scores indicative of the quality of code check-ins performed for each of the plurality of sets of code check-ins;

identifying, by the processor of the computing system, a future time interval based upon a first set of code check-ins of the plurality of code check-ins, wherein the score for the first set meets a threshold value; and responsive to identifying the future time interval based upon the first set of code check-ins having a score meeting the threshold value, triggering an action by the processor of the computing system comprising:

identifying, by the processor of the computing system, a device of a particular user associated with the first set of code check-ins; and automatically transmitting instructions to the identified device to cause the identified device to adjust a setting of the identified device to change a functionality of the identified device during the future time interval.

15. The method of claim 1, wherein the machine learning based model is a recurrent neural network (RNN).

16. The computer-implemented system of claim 13, wherein a set of code check-ins represents code check-ins performed during a time interval.

17. The computer-implemented system of claim 13, wherein adjusting the score for the identified set of code check-ins comprises:

adjusting a measure of quality for the previous code check-in to indicate a decrease in quality of the previous code check-in, wherein the size of adjustment of the measure of quality is determined based on the amount of code reworked in the new code check-in.

18. The computer-implemented system of claim 13, wherein the score for a set of code check-ins is determined by aggregating a measure of quality associated with each code check-in of the set, and wherein the measure of quality associated with a code check-in is adjusted based on a predetermined factor indicative of a complexity of a module in which the code is checked in.

19. The non-transitory computer program product of claim 14, wherein a set of code check-ins represents code check-ins performed during a time interval.

20. The non-transitory computer program product of claim 14, wherein adjusting the score for the identified set of code check-ins comprises:

adjusting a measure of quality for the previous code check-in to indicate a decrease in quality of the previous code check-in, wherein the size of adjustment of the measure of quality is determined based on the amount of code reworked in the new code check-in.

* * * * *